July 10, 1923.

M. J. B. BARBAROU 1,461,343

CLUTCH DEVICE FOR MOTOR VEHICLES

Filed April 21, 1922

MARIUS JEAN BAPTISTE BARBAROU
INVENTOR;
By
his Attorney.

Patented July 10, 1923.

1,461,343

UNITED STATES PATENT OFFICE.

MARIUS JEAN BAPTISTE BARBAROU, OF PARIS, FRANCE.

CLUTCH DEVICE FOR MOTOR VEHICLES.

Application filed April 21, 1922. Serial No. 555,858.

*To all whom it may concern:*

Be it known that I, MARIUS JEAN BAPTISTE BARBAROU, citizen of the French Republic, residing at Paris, in the Republic of France, have invented new and useful Improvements in Clutch Devices for Motor Vehicles, of which the following is a specification.

This invention relates to clutch devices for motor vehicles of a known type in which pivoted levers are used to positively bring the clutching discs or like members to the unclutched position. Said pivoted levers extend through radial grooves provided in a sheet metal member which is secured on the fly-wheel or like part of the engine and they are actuated at their free ends by a ball thrust-bearing which is displaced in the axial direction along the power shaft.

According to the present invention, said sheet-metal member is provided with a groove or like arrangement and a wire or like member disposed in said groove acts as an abutment for the said pivoted levers, whereby the latter do not engage at their free ends with the actuating thrust-bearing when the vehicle is clutched all undue wear of said thrust bearing being thus efficiently prevented.

In the accompanying drawings, given by way of example:

Figure 2:
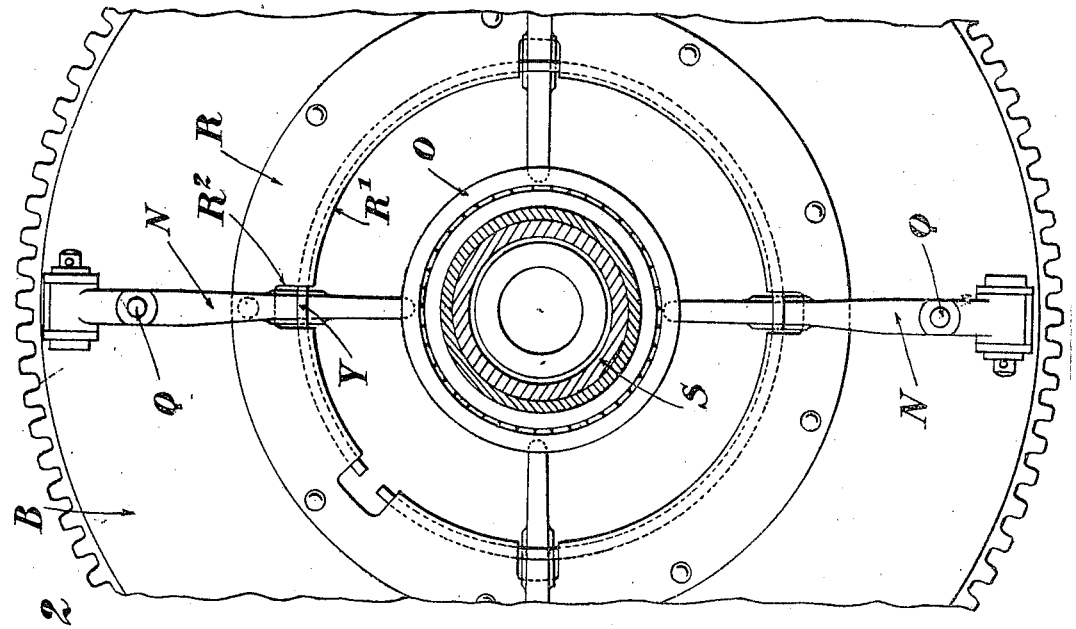
Fig. 2 is an end view of the same, some parts being broken away.
Figure 1:
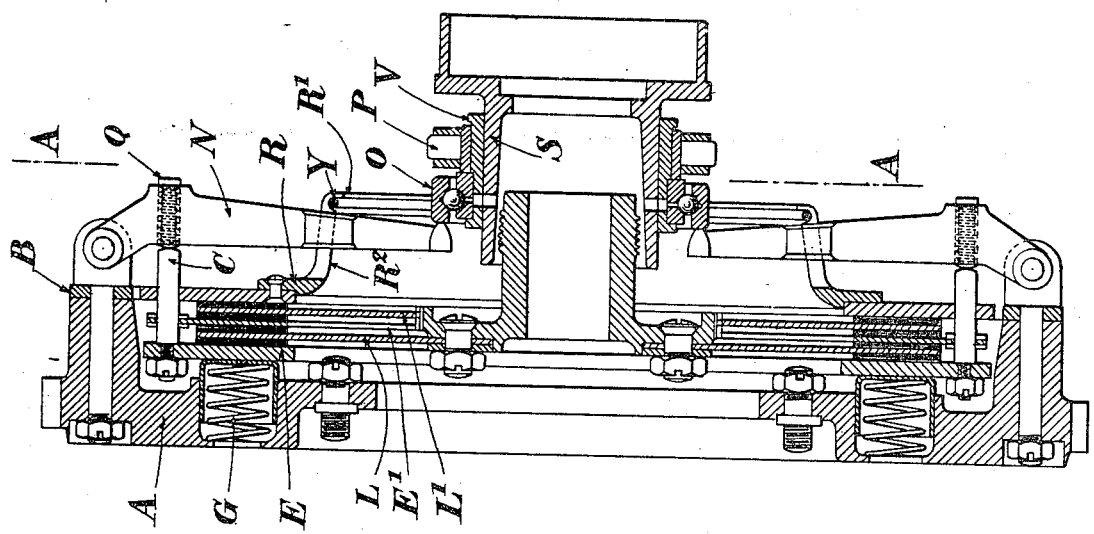
Fig. 1 is an axial section of a clutch device constructed in accordance with the invention.

The general construction of the apparatus is well known. A is the fly-wheel of the engine having secured thereon the sheet metal disc B. Levers N pivoted on the latter may be depressed at their inner ends by the outer ring O of a ball thrust-bearing mounted on a sleeve V which carries trunnions P and may be shifted axially by means of a fork along the part S. On the disc plate B, is secured a sheet metal member R provided with radial slots or notches $R^2$ through which the levers N extend. Said levers N act through the medium of adjusting screws Q upon pushers C secured to the disk E whereby said disk may be positively moved to the left (Fig. 1) for unclutching in opposition to the action of springs G. When the thrust-bearing O is returned to the right, the levers N are released and the springs G act to clutch together the clutch members E $E^1$ L $L^1$.

According to the present invention, the sheet metal disc R is provided with a flange $R^1$ forming a circular groove in which a removable wire or like member Y is securely held in position. The arrangement is such that the levers N will come into contact with said wire when they are released by the thrust bearing O and forced to the right by the springs G. The wire Y will thus act to limit the stroke of the levers N towards the thrust bearing O in such manner that in the normal position of the operative parts of the clutch i. e. when the vehicle is clutched, said levers will not come into contact at their free ends with the actuating thrust-bearing O. The wear of said thrust-bearing is thus efficiently prevented.

Having now described my invention, what I claim as new and desire to secure by Letters Patent is

1. In a clutch device for motor vehicles, the combination of clutching members, rocking levers adapted to act on the same, a thrust-bearing adapted to push said levers in one direction, return springs adapted to move said levers in the opposite direction, a sheet metal member having radial slots through which the levers are adapted to extend, a circular abutment member adapted to limit the rocking movement of the levers towards the thrust-bearing and means on the sheet metal member for retaining said abutment member in position.

2. In a clutch device for motor vehicles, the combination of clutching members, rocking levers adapted to act on the same, a thrust-bearing adapted to push said levers in one direction, return springs adapted to move said levers in the opposite direction, a sheet metal member having radial slots through which the levers are adapted to extend and a ring-shaped wire adapted to limit the rocking movement of the levers towards the thrust-bearing, the sheet metal member being provided with a flange adapted to retain said wire in operative position.

In testimony whereof I have signed my name to this specification.

MARIUS JEAN BAPTISTE BARBAROU.